US008872778B2

(12) United States Patent
Smith et al.

(10) Patent No.: US 8,872,778 B2
(45) Date of Patent: Oct. 28, 2014

(54) APPARATUS WITH CORRELATED EMITTER-DETECTOR PAIRS

(75) Inventors: Euan Smith, Longstanton (GB); Aleksandra Rankov, Huntingdon (GB)

(73) Assignee: Cambridge Display Technology Limited, Cambridgeshire (GB)

( * ) Notice: Subject to any disclaimer, the term of this patent is extended or adjusted under 35 U.S.C. 154(b) by 150 days.

(21) Appl. No.: 13/391,982

(22) PCT Filed: Aug. 31, 2010

(86) PCT No.: PCT/GB2010/001644
§ 371 (c)(1),
(2), (4) Date: Apr. 5, 2012

(87) PCT Pub. No.: WO2011/027101
PCT Pub. Date: Mar. 10, 2011

(65) Prior Publication Data
US 2012/0182265 A1 Jul. 19, 2012

(30) Foreign Application Priority Data

Sep. 4, 2009 (GB) .................................. 0915461.8

(51) Int. Cl.
*G06F 3/041* (2006.01)
*G06F 3/042* (2006.01)
(52) U.S. Cl.
CPC ...... *G06F 3/042* (2013.01); *G06F 2203/04108* (2013.01); *G06F 2203/04109* (2013.01); *G06F 2203/04101* (2013.01)
USPC ........... 345/173; 345/177; 345/178; 345/179; 345/183
(58) Field of Classification Search
CPC . G06F 3/04883; G06F 3/044; G06F 3/04886; G06F 3/045

USPC ............... 345/175, 173, 177–183; 178/18.08, 178/18.09, 18.03, 18.06, 19.07
See application file for complete search history.

(56) References Cited

U.S. PATENT DOCUMENTS 4,301,447 A 11/1981 Funk et al.
4,539,507 A 9/1985 VanSlyke et al.
(Continued)

FOREIGN PATENT DOCUMENTS

CN 101310246 A 11/2008
EP 1 744 241 A1 1/2007
(Continued)

OTHER PUBLICATIONS

Harmuth et al., "Applications of Walsh Functions in Communications," IEEE Spectrum, IEEE Inc., 6(11):82-91 (1969).

(Continued)

*Primary Examiner* — Shaheda Abdin
(74) *Attorney, Agent, or Firm* — Marshall, Gerstein & Borun LLP

(57) ABSTRACT

An apparatus such as a touch screen display includes correlated emitter-detector pairs for determining the amount of electromagnetic radiation received at a detector from its paired emitter. The apparatus comprises an array of emitters operable to emit electromagnetic radiation, an array of detectors for detecting the electromagnetic radiation, and drive control circuitry configured to control the array of emitters so that they emit pulses of electromagnetic radiation. The amplitude of the pulses is modulated using mutually orthogonal binary vectors such as a Paley construction of the Hadamard matrix. Each emitter has a different vector associated with it. Detection circuitry is provided to detect the electromagnetic radiation reaching each particular detector in the array of detectors using the mutually orthogonal binary vector associated with the correlated emitter to produce a correlation between particular emitter-detector pairs. The arrangement can discriminate between near field and touching objects.

13 Claims, 3 Drawing Sheets

(56) References Cited

U.S. PATENT DOCUMENTS

| | | | |
|---|---|---|---|
| 6,130,663 | A | 10/2000 | Null |
| 2004/0245438 | A1 | 12/2004 | Payne et al. |
| 2005/0219229 | A1 | 10/2005 | Yamaguchi |
| 2006/0192766 | A1* | 8/2006 | Nakamura et al. ............ 345/173 |
| 2006/0244693 | A1 | 11/2006 | Yamaguchi et al. |
| 2008/0074401 | A1 | 3/2008 | Chung et al. |
| 2008/0088603 | A1 | 4/2008 | Eliasson et al. |
| 2009/0002329 | A1 | 1/2009 | Van Genechten et al. |
| 2009/0002340 | A1 | 1/2009 | Van Genechten |
| 2011/0074732 | A1* | 3/2011 | Reynolds ....................... 345/174 |

FOREIGN PATENT DOCUMENTS

| | | |
|---|---|---|
| GB | 2 421 304 A | 6/2006 |
| WO | WO-90/13148 A1 | 11/1990 |
| WO | WO-95/06400 A1 | 3/1995 |
| WO | WO-99/21935 A1 | 5/1999 |
| WO | WO-99/48160 A1 | 9/1999 |
| WO | WO-02/067343 A1 | 8/2002 |
| WO | WO-03/083767 A2 | 10/2003 |
| WO | WO-2004/081502 A2 | 9/2004 |
| WO | WO-2007/058727 A1 | 5/2007 |
| WO | WO-2008/004103 A2 | 1/2008 |

OTHER PUBLICATIONS

"Walsh Function," Wolfram MathWorld™ (1999-2012). Retrieved from the Internet on Jun. 20, 2012: URL:http://mathworid.wolfrarn.com/WalshFunction.html.

Weisstein, "Hadamard Matrix," Mathworld—A Wolfram Web Resource (© 1992-2012). Retrieved from the Internet on May 25, 2012: URL:http://mathworld.wolfram.com/HadamardMatrix.html.

Wikipedia®, "Hadamard Matrix," (2010). Retrieved from the Internet on May 25, 2012: URL:http://.en.wikipedia.org/wiki/Hadamard_matrix.

Wikipedia®, "Walsh Function," (2012). Retrieved from the Internet on Jun. 20, 2012: URL:http://_en.wikipedia.org/wiki/Walsh_function.

International Preliminary Report on Patentability for Application No. PCT/GB2010/001644, dated Mar. 6, 2012.

International Search Report and Written Opinion for Application No. PCT/GB2010/001644, dated Dec. 30, 2010.

Search Report for Application No. GB0915461.8, dated Dec. 18, 2009.

Partial English translation of Office Action for corresponding Chinese Patent Application No. 201080045903.1, dated May 4, 2014.

* cited by examiner

APPARATUS WITH CORRELATED EMITTER-DETECTOR PAIRS

BACKGROUND OF THE INVENTION

1. Field of the Invention

This invention relates to apparatus having correlated emitter-detector pairs for determining the amount of electromagnetic radiation received at a detector from its paired emitter. It relates particularly, though not exclusively, to optical (including infra-red) touch screen display screens, which may be integrated as part of an Organic Light Emitting Diode (OLED) display device.

2. Related Technology

It is known to provide infra-red touch screen technology integrated into Liquid Crystal Diode (LCD) displays. However, such technology can only detect the presence of an object touching the screen; it does not actually provide images of the objects, hence does not provide information regarding their size and shape and cannot, for example, recognize bar codes. Furthermore, it has proved difficult to integrate infra-red emitters and detectors onto a single back plane together with the LCDs. In general, the infra-red emitters and detectors are positioned behind the LCD plane, which is more complicated, and therefore costly, to manufacture.

Near field optical touch screens are known, in which the presence of a near field object, i.e. an object that is close to, but not actually touching, the display screen is detected using proximity detection. Optical touch screens which detect the presence of an object that actually touches the display screen are also known, where the touching object is detected using Frustrated Total Internal Reflection (FTIR). In this case, the light from the emitter is totally internally reflected from the surface of the display and is detected by detectors positioned in a line from that emitter. If an object touches the surface of the display, the total internal reflection is frustrated, since the light is absorbed by the object touching the surface of the screen. In this way, by having a plurality of rows and columns of detectors, the position of the object can be determined by detecting in which row and which column the total internal reflection is frustrated.

Known touch screen displays having light emitting and light detecting means are described in US 2004/0245438 and US 2006/0244693.

SUMMARY OF THE INVENTION

The present invention seeks to provide an improved apparatus having correlated emitter-detector pairs for determining the amount of electromagnetic radiation received at a detector from its paired emitter.

According to a first aspect of the present invention, there is provided an apparatus having correlated emitter-detector pairs for determining the amount of electromagnetic radiation received at a detector from its paired emitter, the apparatus comprising an array of emitters operable to emit electromagnetic radiation and an array of detectors operable to detect said electromagnetic radiation, drive control circuitry configured to control the array of emitters so that they emit pulses of electromagnetic radiation at substantially the same clock frequency, the amplitude of the pulses being modulated using a set of mutually orthogonal binary vectors, each emitter in the array having a different mutually orthogonal binary vector associated with it, and detection circuitry operable to process a signal corresponding to the electromagnetic radiation reaching each particular detector in the array of detectors using the mutually orthogonal binary vector associated with the correlated emitter to produce a detection signal for that particular detector, said detection circuitry being configured to produce a correlation between particular emitter-detector pairs so that a detection signal from a particular detector relates to electromagnetic radiation emitted from the particular emitter of that emitter-detector pair.

According to a second aspect of the present invention, there is provided a touch screen display device for providing a digital representation of the size and/or position of a near and/or a touching object including a touch screen, the device being operable to provide a digital representation of the size and/or position of an object near and/or in contact with said touch screen in use, the touch screen having a back plane and a transparent substrate having a front surface, the back plane comprising a plurality of display pixels provided on the back plane, the plurality of display pixels generating an image for display, the touch screen display device further comprising apparatus according to the first aspect of the invention integrated into the touch screen display device, with the array of emitters and the array of detectors being interspersed among the display pixels, and with the emitted electromagnetic radiation being coupled to the transparent substrate so as to reach the front surface thereof, wherein the electromagnetic radiation which is emitted by an emitter at an angle smaller than a critical angle for the transparent substrate is transmitted through the front surface of the transparent substrate and the electromagnetic radiation which is emitted by the emitter at an angle greater than the critical angle for the transparent substrate is totally internally reflected at the front surface of the transparent substrate, the processing circuitry thereby determining the electromagnetic radiation that is received by each detector that may be due to direct reflection from a near field object and the electromagnetic radiation that is totally internally reflected and which may be frustrated by an object in contact with said front surface and producing digital representations of any such near field and/or contacting objects.

The present invention is particularly suitable for integration as part of an Organic Light Emitting Diode (OLED) display device.

Organic light emitting diodes (OLEDs) comprise a particularly advantageous form of electro-optic display. They are bright, colorful, fast switching, provide a wide viewing angle and are easy and cheap to fabricate on a variety of substrates.

Organic (which here includes organometallic) LEDs may be fabricated using either polymers or small molecules in a range of colors, depending upon the materials used. Examples of polymer-based organic LEDs are described in WO 90/13148, WO 95/06400 and WO 99/48160; examples of small molecule based devices are described in U.S. Pat. No. 4,539,507 and examples of dendrimer-based materials are described in WO99/21935 and WO02/067343.

A basic structure of a typical organic LED involves a glass or plastic substrate supporting a transparent anode layer comprising, for example, indium tin oxide (ITO) on which is deposited a hole transport layer, an electroluminescent layer and a cathode. The electroluminescent layer, may comprise, for example, PEDOT: PSS (polystyrene-sulphorate-doped polyethylene-dioxythiophene). The cathode layer typically comprises a low work function metal such as calcium and may include an additional layer immediately adjacent electroluminescent layer, such as a layer of aluminum, for improved electron energy level matching. Contact wires to the anode and the cathode respectively provide a connection to a power source. The same basic structure may also be employed for small molecule devices. In this structure, light can be emitted through the transparent anode and substrate and devices with this structure are referred to as "bottom emitters". Devices which emit through the cathode may also be constructed, for example, by keeping the thickness of the cathode layer to less than around 50-100 mm so that the cathode is substantially transparent.

Organic LEDs may be deposited on a substrate in a matrix of pixels to form a single or multi-color pixellated display. A multi-colored display may be constructed using groups of red, green and blue emitting pixels. In such displays the individual elements are generally addressed by activating row (or column) lines to select the pixels, and rows (or columns) of pixels are written to, to create a display. So-called active matrix displays have a memory element, typically a storage capacitor and a transistor, associated with each pixel whilst passive matrix displays have no such memory element and instead are repetitively scanned, somewhat similarly to a CRT picture, to give the impression of a steady image.

BRIEF DESCRIPTION OF THE DRAWINGS

Particular embodiments of the invention will now be more fully described, by way of example, with reference to the drawings, of which.

DETAILED DESCRIPTION

Figure 1:
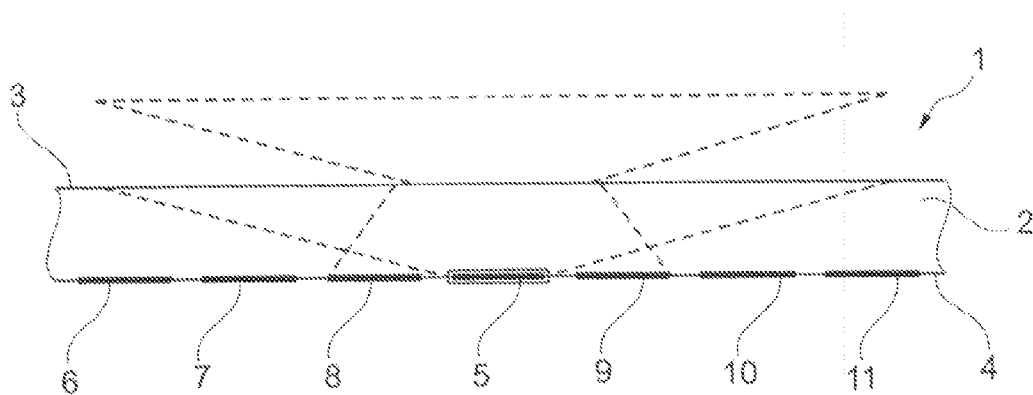
FIG. 1 shows a schematic diagram of a touch screen forming part of a display device according to one embodiment of the present invention.

Thus, as shown in FIG. 1, a touch screen 1 forming part of an OLED touch screen display device according to a first embodiment of the present invention is formed by a transparent substrate 2 having a front surface 3 and a back plane 4 on which are formed a first array of OLED emitters and a second array of detectors. In FIG. 1, for simplicity, only one emitter is shown, together with a plurality of detectors, to enable the operation of the device to be more easily explained. As shown, the back plane 4 of the transparent substrate 2 is provided with an OLED emitter 5 and a number of detectors 6-11 arranged either side of the emitter 5. Light from the OLED emitter 5 is emitted over a wide range of angles up to 180°, although a coverage of approximately 120°, is shown for clarity. Light that is emitted at angles greater than the critical angle for the transparent substrate is totally internally reflected from the front surface 3 of the transparent substrate 2 and reaches detectors 6, 7, 10, 11, as shown, whereas light that is emitted by the emitter 5 at an angle smaller than the critical angle is transmitted through the substrate 2 and then diverges after exiting the front surface 3 of the substrate 2.

Figure 2:
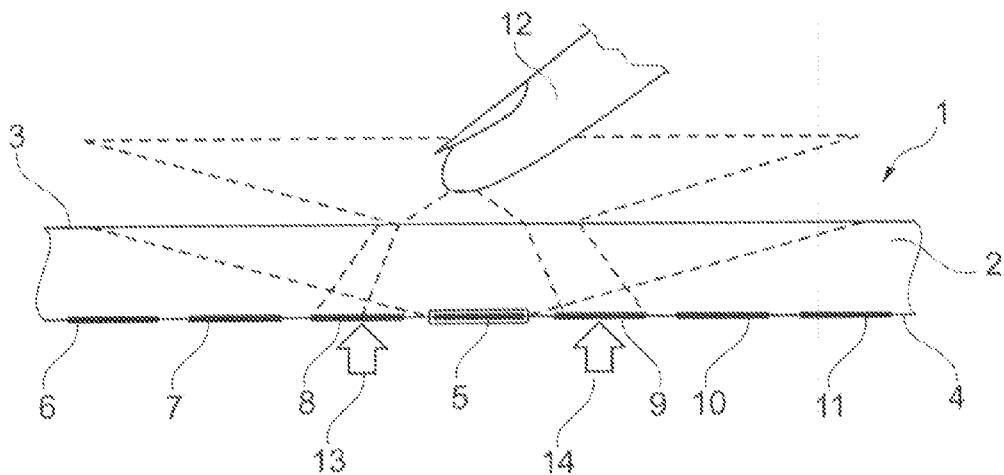
FIG. 2 shows the touch screen of FIG. 1 with a near field object.

When an object 12, such as a user's finger, approaches the touch screen, but without touching it, it becomes a near field object, as shown in FIG. 2. The near field object 12, which is located within the light that passes through the substrate, reflects back some of that light. As shown, the near field object 12 is positioned off-center with respect to the emitter 5, so more light is reflected to detector 8 (as shown by large arrow 13) and less light reaches detector 9 (as shown by small arrow 14). Thus, the presence and location of near field object can be determined by detecting increases in light received at a number of detectors from different emitters.

Figure 3:
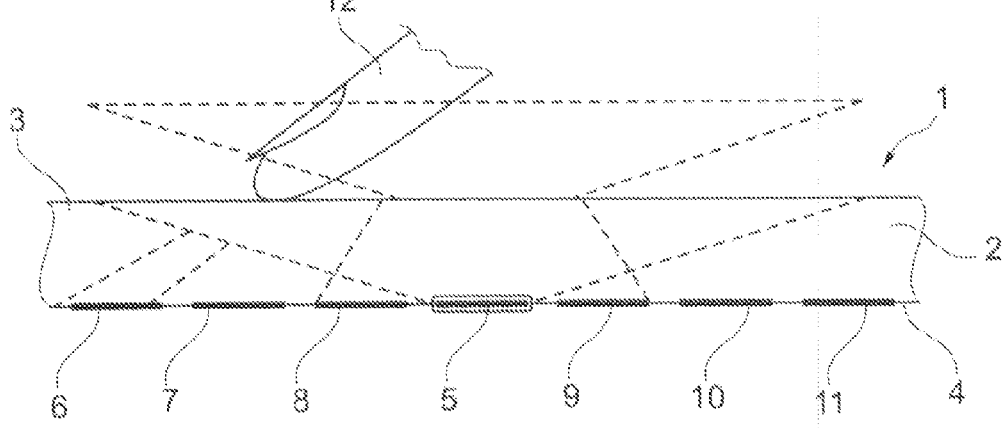
FIG. 3 shows the touch screen of FIG. 1 with a touching object.

Turning now to FIG. 3, there is shown an object 12, such as a user's finger, which is touching the front surface 3 of the transparent substrate 2 at a point where light from the emitter 5 is totally internally reflected from the front surface 3. In this case, the light which would otherwise reach detector 6 is prevented from doing so, because the total internal reflection is frustrated by the touching object 12. It will be apparent, therefore, that measuring the reduction in light received at a detector will enable the presence of a touching object to be determined. Furthermore, by detecting such reductions at a number of detectors from different emitters, the location of the touching object can be determined.

Although the above explanation has been made showing the light from one emitter to several detectors, it will be apparent that the situation is analogous when considering the light received at one detector from a plurality of emitter, with the light received from neighbouring emitters being due to reflection from near-field objects and light from further objects being from TIR, with frustration of that TIR light being due to touching objects. Thus, by constructing arrays of emitters and detectors, two digital representations can be produced through signal analysis—one for near-field objects and one for touching objects. Of course, a touching object can be considered as a (very) near-field object and will produce similar reflected light. However, a near-field object will not frustrate totally internally reflected light (unless it is extremely close to being in contact with the front surface), so the two types of objects can be discriminated by having both types of information.

Figure 4:
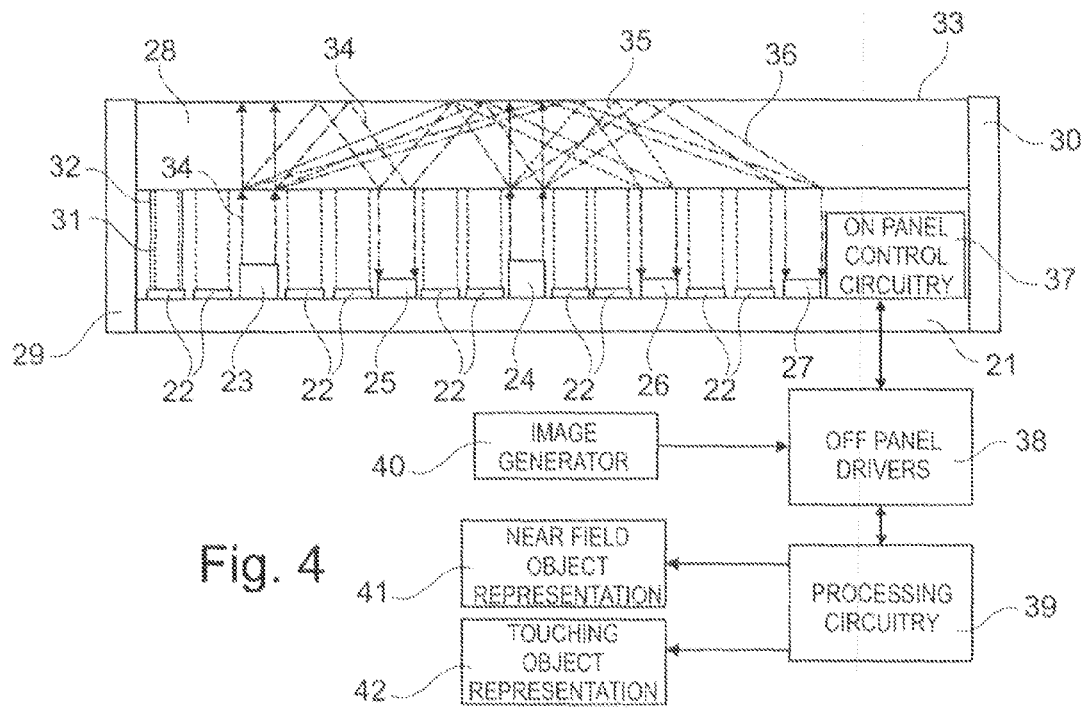
FIG. 4 shows a schematic diagram of a touch screen display device according to a second embodiment of the present invention.

As shown in FIG. 4, a touch screen display device according to a second embodiment of the present invention, has a back plane 21 on which are provided display pixels 22, emitters 23 and 24 and detectors 25, 26 and 27. In this embodiment, the back plane is a separate structural member from a transparent substrate 28 and is connected thereto by structural side elements 29 and 30. The display pixels 22 are preferably OLED display pixels and the emitters 23 and 24 are also preferably OLED emitters. The detectors may be organic photodetectors, such as phototransistors or photodiodes.

The light emitted by the display pixels 22, as shown by dotted lines 31, is coupled by any suitable coupling means 32, such as a conformal optically transparent material, to the transparent substrate 28. This light will, in general, be transmitted through the transparent substrate 28 and pass through a front surface 33 thereof, to produce a display image for viewing from the front of the touch screen display device. Similarly, light from emitters 23 and 24, as shown by long dashed lines 34, is coupled by a suitable coupling means (not shown for clarity), such as a conformal optically transparent material, to the transparent substrate 28. This light will, partly, be transmitted through the transparent substrate 28 and pass through the front surface 33 thereof, as described above with reference to FIGS. 1 to 3, and will partly be totally internally reflected at the front surface 33. The light that is totally internally reflected will be received by the detectors 25, 26 and 27. For ease of understanding, the light received by detector 25 is shown as dash and single dotted lines 35, irrespective of whether it is emitted by emitter 23 or emitter 24. Similarly, light received by detector 26 is shown as short dashed lines 36 and light received by detector 27 is shown as dash and double dotted lines 36. Again, suitable coupling means (not shown for clarity), such as a conformal optically transparent material, are provided to couple light between the transparent substrate 28 and the detectors 25, 26 and 27.

The components (display pixels 22, emitters 23 and 24 and detectors 25, 26 and 27) on the back plane 21 are connected to on-panel control circuitry 37 for controlling their operation. The on-panel control circuitry 37 is coupled to off-panel operational circuitry, including off-panel drivers 38, and processing circuitry 39. The processing circuitry 39 is used to analyse the light detected from the detectors 25, 26 and 27 and to produce a digital representation 41 (map) of the touch screen and any near field objects adjacent thereto and a digital representation 42 (map) of the touch screen and any touching objects adjacent thereto. An image generator 40 is coupled to the off-panel drivers 38 to control the off-panel drivers 38 to control the OLED display pixels 22 to produce the image(s) for display.

Figure 5:
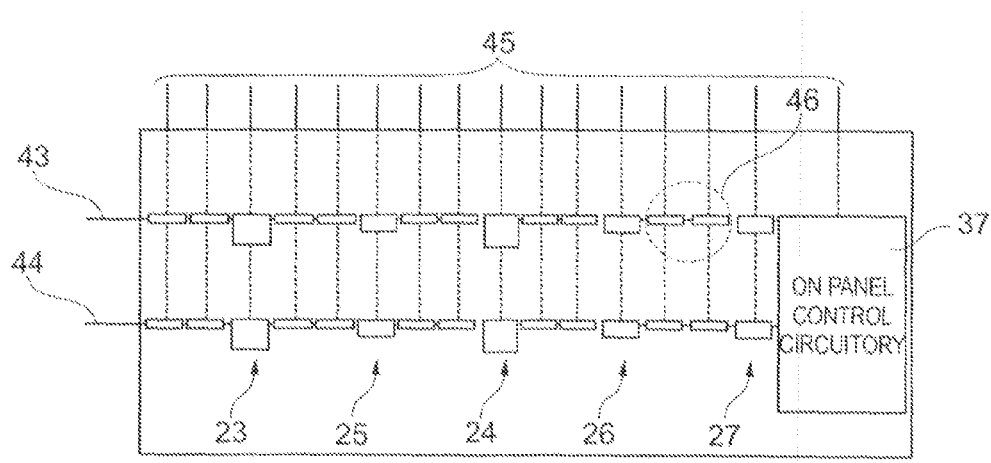
FIG. 5 shows a schematic plan view of two rows of an array forming part of the touch screen display device of FIG. 4.

Turning now to FIG. 5, there is shown part of an array of display pixels 22, emitters 23 and 24 and detectors 25, 26 and 27 on the back plane 21. In this case, two rows are shown connected to separate on-off driver inputs 43 and 44. Both rows of components are also connected to the on-panel control circuitry 37. As shown, each of the components in a row are also connected to column driver inputs 45. By choosing to enable one particular row driver input 43 or 44 and using appropriate column driver inputs 45, each of the components of that row can be controlled, even when, as shown, all components of a particular column are coupled together to the same column driver input 45.

One simple example of how the device may be used to determine touching objects is shown in the top row of FIG. 5 (connected to row driver input 43). In this case, light (34, 35) from emitters 23 and 24 that is totally internally reflected at the front surface 33 of the transparent substrate 28 reaches detectors 25 and 26 in the usual manner. However, a touching object 46 that touches the front surface 33 of the transparent substrate 28 between detectors 26 and 27 frustrates the totally internally reflected light 36 so that it does not reach detector 27. Thus, the fact that light from emitters 23 and 24 reaches detector 26, but does not reach detector 27 means that it is frustrated by a touching object 46 located between detectors 26 and 27.

Of course, as described above, by determining how much light is received, and whether it is increased or decreased, the difference between frustrated totally internally reflected light and reflected light can be determined, thus providing information as to which emitters are "blocked" by the touching object, and which emitters have had light reflected by a near-field object.

However, in more complicated systems with a large number of emitters, the detectors will receive light from a large number of different emitters and it will be difficult to measure a desired signal from a desired emitter. One method would be to illuminate only one emitter at a time and determine which detectors detect that light, and then to illuminate all the other emitters similarly in turn. However, if there are a large number of emitters, then the total scan time will become too long. One alternative is to modulate the emitters with different frequencies and to filter the detectors to receive only the modulation frequency of the paired emitter. In this example, since there are two emitters 23 and 24, the light from emitter 23 can be modulated as a first square wave 47 and the light from emitter 24 can be modulated as a second square wave 48, having half the frequency of the first square wave 47. The combination of the first and second square waves 47 and 48 produces the combined waveform 49. It will thus be apparent that, depending on which modulated waveform is received at a particular detector, the position of the touching object can be determined. Furthermore, if a combined waveform is received, especially if there are more than two emitters and the combined waveform has light from a number of different emitters, it can be filtered using appropriate high and low pass filters to determine the amount of light received at each frequency, and therefore from each different emitter.

Once it has been determined, for each detector, whether light from a particular emitter has been received or not, a matrix providing the results for each emitter and detector in a particular row (or other set) can be generated. Thus, by comparing one matrix with another matrix generated later in time, changes due to reflection of light by near-field objects and frustration due to touching objects can be determined. It will be apparent, of course, that depending on how far the totally internally reflected light can travel, some results of emitter/detector pairs can be disregarded since they will never be positive, if the pair are too far apart. This would reduce the amount of data within a matrix that needed to be analysed by the processing circuitry to produce the digital representations (maps) of the touch screen showing any near-field objects and touching objects respectively.

Nevertheless, it can be difficult in this method to match large numbers over differing frequencies of operation. Furthermore, Moiré patterns (i.e. beat signals) between different signal frequencies can result in either spurious cross-talk or require integration at a low common factor frequency, thereby slowing down the capture rate.

Accordingly, in a preferred embodiment of the invention, the simultaneously driven emitters are driven at substantially the same clock frequency with a set of mutually orthogonal binary vectors. This drive signal is also correlated with the detected signal to obtain the correct signal contribution from only the paired emitter for each detector.

One example of such a suitable set of mutually orthogonal binary vectors are Walsh functions (as described, for example, at http://en.wikipedia.org/wiki/Walsh_function or, for example, at http://mathworld.wolfram.com/WalshFunction.html). In this case, for a set of n emitters $E_n$ and n detectors $D_n$, the drive circuitry is clocked at the same frequency and each emitter is driven according to the appropriate set of mutually orthogonal binary. Taking the number of emitters in the set to be seven (n=7), a suitable set of drive vectors $V_n$ are:

$V_1(t)=[1, 1, 1, 1, -1, -1, -1, -1]$
$V_2(t) [1, 1, -1, -1, -1, -1, 1, 1]$
$V_3(t)=[1, 1, -1, -1, 1, 1, -1, -1]$
$V_4(t)=[1, -1, -1, 1, 1, -1, -1, 1]$
$V_5(t)=[1, -1, -1, 1, -1, 1, 1, -1]$
$V_6(t)=[1, -1, 1, -1, -1, 1, -1, 1]$
$V_7(t)=[1, -1, 1, -1, 1, -1, 1, -1]$

The key factor here is that these vectors are mutually orthogonal. i.e.:

$$\frac{1}{4} \sum_t V_n V_m = \begin{cases} 1, & n = m \\ 0, & n \neq m. \end{cases}$$

It will be appreciated that the "opposite" to being enabled with a "1" can be either disabled as a "0" or "undriven" which is shown here as a "−1". Although either could be used, there are implementation advantages to using "−1" since it is the inverse of "1" and this will be used hereinafter. Thus, each emitter is driven with their corresponding vector (i.e. driven when V(t)=1 and undriven when V(t)=−1). The light from each emitter will couple, to a degree, to each detector. For a single detector (say n=2) as an example and assuming that the light reaching this detector from each of the seven emitters is (in arbitrary units): [5, k, 5, 4, 3, 2, 1], where k is the signal (from emitter n=2) that we are interested in detecting, the total signal with time will be given by multiplying the values given above by the factors for each time sample from the vectors given above where "−1" does not apply. This gives:

t=1: 5+k+5+4+3+2+1=20+k
t=2: 5+k+5=10+k
t=3: 5+2+1=8
t=4: 5+4+3=12
t=5: 5+4+1=10
t=6: 5+3+2=10
t=7: k+3+1=4+k
t=8: k+4+2=6+k

The total signal with time is therefore:

$D_2(t)$=[20+k, 10+k, 8, 12, 10, 10, 4+k, 6+k]

Figure 6:
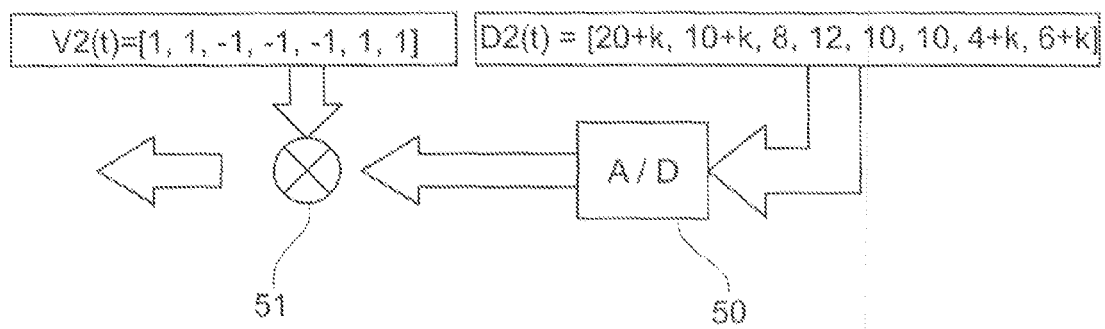
FIGS. 6 (a) and (b) show schematic implementations of digital and analog integration circuitry that can be used in an embodiment of the present invention.
Figure 6:
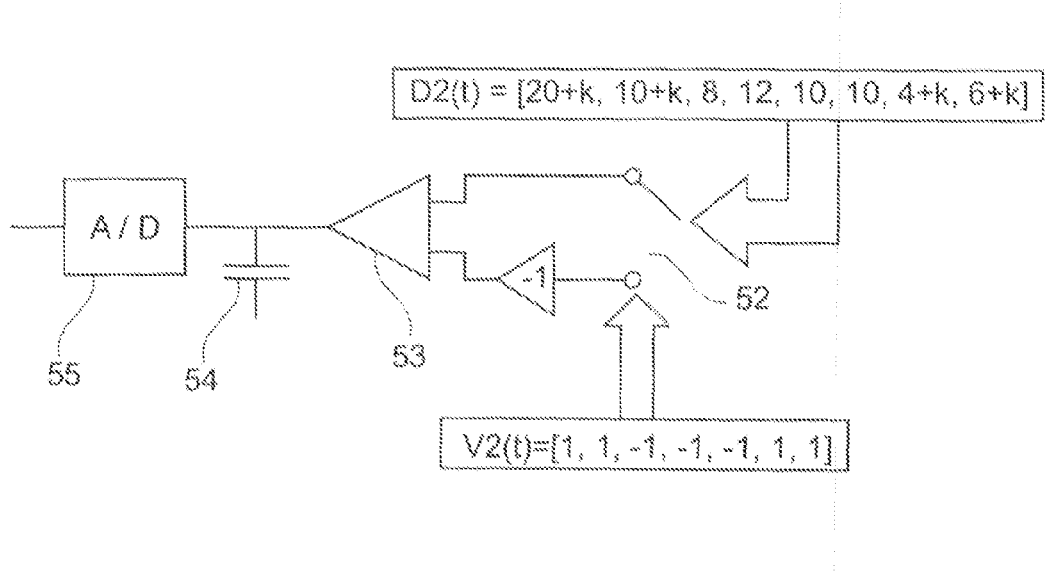

The detection circuitry, which may be part of the processing circuitry, may be designed to integrate the signals in the analog realm prior to being digitized, or may be designed to integrate the digitized signals. FIG. 6(a) shows digital integration and shows the signal $D_2(t)$ coming from an emitter to an Analog to Digital Converter (A/D) 50. The output from the A/D 50 is passed to a multiplier 51 where it is multiplied by the signal $V_2(t)$ defined above, so that the integrated signal will be:

20+k+10+k−8−12−10−10+4+k+6+k

Grouping the terms gives:

30+4k−30=4k

Thus, it can be seen that the resultant signal is only proportional to the light reaching the detector from its associated emitter and therefore cross-talk is avoided. FIG. 6(b) shows similar circuitry, but where the integration is carried out in the analog field. In this case, the signal $D_2(t)$ from the emitter is passed to a multiplexer 52, which switches the signal input from the positive input of an operational amplifier 53 to a negative input of the operational amplifier. An output of the operational amplifier is then integrated by means of capacitor 54, whose output is then digitized by A/D 55.

This method allows the circuit to be designed for an equal drive frequency across the panel, thereby improving the uniformity of operation and signal to noise. The method also enables a fixed integration time (an integer number of sweeps through the vectors) without any danger of a Moiré effect, and enables the use of digital circuitry with a single base clock frequency.

There are several systems of mutually orthogonal binary vectors, where a set can make up a so-called Hadamard matrix (as described, for example at http://en.wikipedia.org/wiki/Hadamard_matrix, or, for example, at http://mathworld.wolfram.com/HadamardMatrix.html). One construction which may be very suitable for this application is the Paley construction of the Hadamard matrix. In this case the vectors (after the first vector) consist of a 1 followed by a sequence which is shifted by one place for each subsequent vector. For example for 7 emitter/detector pairs as above:

$V_1(t)$=[1, <u>−1</u>, 1, 1, −1, 1, −1, −1]
$V_2(t)$=[1, −1, <u>−1</u>, 1, 1, −1, 1, −1]
$V_3(t)$=[1, −1, −1, <u>−1</u>, 1, 1, −1, 1]
$V_4(t)$=[1, 1, −1, −1, <u>−1</u>, 1, 1, −1]
$V_5(t)$=[1, −1, 1, −1, −1, <u>−1</u>, 1, 1]
$V_6(t)$=[1, 1, −1, 1, −1, −1, <u>−1</u>, 1]
$V_7(t)$=[1, 1, 1, −1, 1, −1, −1, <u>−1</u>]

It will be seen that the first number in each vector is a 1. One of the numbers in the subsequent sequence has been underlined so that the shift of the sequence can be more easily observed. This sequence has two advantages: firstly, that only a single sequence needs to be stored; the rest can be derived from it; and, secondly, that each emitter is driven with broadly the same frequency components.

A final point to note on the implementation of this scheme is that each of the orthogonal vector sets mentioned above starts with a 1. It is equally valid to invert this sequence so that each starts with a −1; they will still be orthogonal. In this case it would be possible to use this time period with each emitter off, so as to zero the detection circuitry against a background signal level to avoid any potential issues with the signal being a small component on a larger background (for example if the touch-screen is in daylight).

Further processing circuitry (not shown) can be used to analyse the digital representations 41 and 42 to provide a temporal analysis of the size, shape and location of the near-field and touching objects to be able to determine their lateral movement. By correlating the digital representations of the near field and touching objects and their movements, the processing circuitry can determine which of the near field objects have moved towards the touch screen to become touching objects and which touching objects have moved away from the touch screen to become near field objects. This allows the processing apparatus to utilize the lateral movement of a near field object to control movement of a virtual object, such as a computer cursor, and to utilize the movement of the near field object towards the touch screen to become a touching object as actuation of the cursor (i.e. a "click"). In this way, the system can respond to either movement of a cursor due to movement of a near field object or to actuation of the cursor due to the object touching the touch screen.

In summary, we have described an apparatus such as a touch screen display, which includes correlated emitter-detector pairs for determining the amount of electromagnetic radiation received at a detector from its paired emitter. The apparatus comprises an array of emitters (23, 24) operable to emit electromagnetic radiation, an array of detectors (25, 26, 27) for detecting said electromagnetic radiation, and drive control circuitry (37, 38, 39) configured to control the array of emitters (23, 24) so that they emit pulses of electromagnetic radiation. The amplitude of the pulses is modulated using mutually orthogonal binary vectors such as a Paley construction of the Hadamard matrix. Each emitter has a different vector associated with it. Detection circuitry is provided to detect the electromagnetic radiation reaching each particular detector in the array of detectors using the mutually orthogonal binary vector associated with the correlated emitter to produce a correlation between particular emitter-detector pairs. The arrangement can discriminate between near field and touching objects.

Although only some particular embodiments of the invention have been described in detail, various modifications and improvements will be immediately apparent to a person skilled in the art. Equivalent means to achieve a function may be substituted for a specific means mentioned in this description. Such modification, improvements, and equivalents are within the scope of the present invention.

The invention claimed is:

1. A touch screen display device having correlated emitter-detector pairs for determining the amount of electromagnetic radiation received at a detector from its paired emitter integrated into the display, the display device comprising:

a touch screen having a back plane and a transparent substrate having a front surface, a plurality of display pixels provided on the back plane, the plurality of display pixels generating an image for display, an array of emitters operable to emit electromagnetic radiation and an array of detectors operable to detect said electromagnetic radiation, drive control circuitry configured to control the array of emitters so that the emitters emit pulses of electromagnetic radiation at substantially the same clock frequency, an amplitude of the pulses being modulated using a set of mutually orthogonal binary vectors, each emitter in the array having a different mutually orthogonal binary vector associated with it, detection circuitry operable to process a signal corresponding to the electromagnetic radiation reaching each particular detector in the array of detectors using the mutually orthogonal binary vector associated with the correlated emitter to produce a detection signal for that particular detector, said detection circuitry being configured to produce a correlation between particular emitter-detector pairs so that a detection signal from a particular detector relates to electromagnetic radiation emitted from the particular emitter of that emitter- detector pair, and processing circuitry coupled to the detection circuitry for processing the detection signals corresponding to each emitter-detector pair to produce a digital representation of the size and/or position of the object, wherein the detection signal is increased by reflection of the electromagnetic radiation from an object near the apparatus, wherein the array of emitters and the array of detectors are interspersed among the display pixels, wherein the electromagnetic radiation emitted at an angle smaller than a critical angle for the transparent substrate is transmitted through the front surface of the transparent substrate and the electromagnetic radiation emitted at an angle greater than the critical angle for the transparent substrate is totally internally reflected at the front surface of the transparent substrate, the processing circuitry thereby determining the electromagnetic radiation that is received by each detector due to direct reflection from a near field object and determining the electromagnetic radiation that is totally internally reflected and frustrated by an object in contact with said front surface and producing digital representations of any such near field and/or contacting objects.

2. A touch screen display device according to claim 1, wherein the mutually orthogonal binary vectors comprise Walsh functions.

3. A touch screen display device according to claim 1, wherein the mutually orthogonal binary vectors comprise a Hadamard matrix.

4. A touch screen display device according to claim 3, wherein the mutually orthogonal binary vectors comprise a Paley construction of the Hadamard matrix.

5. A touch screen display device according to claim 1, wherein the electromagnetic radiation is at an infra-red wavelength.

6. A touch screen display device according to claim 1, wherein the display pixels are Organic Light Emitting Diodes (OLEDs).

7. A touch screen display device according to claim 6, wherein the emitters are Organic Light Emitting Diodes (OLEDs).

8. A touch screen display device according to claim 6, wherein the detectors are organic photodetectors.

9. A touch screen display device according to claim 6, wherein the array of emitters is coupled to an active matrix driver arrangement.

10. A touch screen display device according to claim 1, wherein the emitters are Organic Light Emitting Diodes (OLEDs).

11. A touch screen display device according to claim 1, wherein the detectors are organic photodetectors.

12. A touch screen display device according to claim 1, wherein the array of emitters is coupled to an active matrix driver arrangement.

13. A touch screen display device according to claim 1, wherein the processing circuitry is operable to discriminate between an object that is near to the apparatus and an object that is in contact with the surface of the apparatus and to produce digital representations of near and contacting objects.

* * * * *